(12) United States Patent
Huang et al.

(10) Patent No.: US 10,644,554 B2
(45) Date of Patent: May 5, 2020

(54) VIBRATION DEVICE

(71) Applicant: AAC Technologies Pte, Ltd., Singapore (SG)

(72) Inventors: Jinquan Huang, Shenzhen (CN); Wenli Wang, Shenzhen (CN); Hongfu Xu, Shenzhen (CN); Fanghua Ling, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 457 days.

(21) Appl. No.: 15/645,825

(22) Filed: Jul. 10, 2017

(65) Prior Publication Data
US 2018/0297062 A1    Oct. 18, 2018

(30) Foreign Application Priority Data
Apr. 14, 2017    (CN) .................... 2017 2 0397178 U

(51) Int. Cl.
| | | |
|---|---|---|
| *H02K 1/34* | (2006.01) | |
| *B06B 1/04* | (2006.01) | |
| *H02K 33/00* | (2006.01) | |
| *H02K 11/33* | (2016.01) | |
| *H02K 33/18* | (2006.01) | |
| *H02K 33/16* | (2006.01) | |

(52) U.S. Cl.
CPC .............. *H02K 1/34* (2013.01); *B06B 1/045* (2013.01); *H02K 11/33* (2016.01); *H02K 33/00* (2013.01); *H02K 33/16* (2013.01); *H02K 33/18* (2013.01)

(58) Field of Classification Search
CPC .......... B06B 1/045; H02K 11/33; H02K 1/34; H02K 33/00; H02K 33/16; H02K 33/18
See application file for complete search history.

(56) References Cited

U.S. PATENT DOCUMENTS

| | | | | |
|---|---|---|---|---|
| 7,671,493 | B2* | 3/2010 | Takashima | .............. B06B 1/045 |
| | | | | 310/12.16 |
| 7,825,742 | B2* | 11/2010 | Lee | .......................... H03L 1/04 |
| | | | | 331/158 |
| 8,575,794 | B2* | 11/2013 | Lee | ........................ H02K 33/18 |
| | | | | 310/12.31 |
| 8,624,450 | B2* | 1/2014 | Dong | ..................... H02K 33/16 |
| | | | | 310/15 |
| 8,878,401 | B2* | 11/2014 | Lee | ........................ H02K 33/16 |
| | | | | 310/15 |

(Continued)

Primary Examiner — Mohamad A Musleh
(74) Attorney, Agent, or Firm — IPro, PLLC; Na Xu

(57) ABSTRACT

A vibration device includes a housing having accommodating space, a vibrator, a stator and an elastic member configured to suspend the vibrator in the accommodating space, the vibrator, the stator and the elastic member are accommodated in the housing, one of the vibrator and the stator includes a magnetic circuit unit while the other one includes a coil, the housing includes a pair of first side walls symmetrically arranged in its long axis direction and a pair of second side walls symmetrically arranged in a short axis direction, the elastic member is a sheet-like spring perpendicular to vibrating direction of the vibrator, the elastic member includes a first fixing portion fixedly connected with the second side wall, a second fixing portion fixedly connected with the vibrator, and an S-shaped connecting portion which connects the first fixing portion with the second fixing portion and extends along long axis direction.

9 Claims, 4 Drawing Sheets

(56) References Cited

U.S. PATENT DOCUMENTS

| | | | |
|---|---|---|---|
| 2005/0121984 A1* | 6/2005 | Nakamura | H02K 33/06 310/12.03 |
| 2008/0216578 A1* | 9/2008 | Takashima | B06B 1/045 73/658 |
| 2011/0006618 A1* | 1/2011 | Lee | B06B 1/045 310/25 |
| 2011/0068641 A1* | 3/2011 | Choi | H02K 33/16 310/25 |
| 2011/0115310 A1* | 5/2011 | Dong | H02K 33/16 310/28 |
| 2011/0115311 A1* | 5/2011 | Dong | H02K 33/16 310/28 |
| 2012/0049660 A1* | 3/2012 | Park | B06B 1/045 310/25 |
| 2018/0236488 A1* | 8/2018 | Miyazaki | B06B 1/045 |
| 2018/0241293 A1* | 8/2018 | Miyazaki | H02K 33/16 |
| 2018/0351442 A1* | 12/2018 | Liu | H02K 33/02 |

* cited by examiner

VIBRATION DEVICE

TECHNICAL FIELD

The present disclosure relates to the field of electronic devices and, particularly, to a vibration device.

BACKGROUND

With the development of electronic technologies, portable consumption electronic product such as cellphone, handheld game player, navigation device or handheld multimedia entertainment device and the like is becoming more and more popular. Generally, these electronic products will use a vibration device for system feedback such as call prompt, message prompt, navigation prompt of a cellphone, and vibration feedback of a game player, etc.

The existing vibration device includes a housing, a stator and a vibrator. The stator and the vibrator are accommodated in the housing. The stator includes a magnet and a magnetic conductor accommodating the magnet. A spring is also provided in the housing. The existing spring is of an S-shaped structure, two ends of the S-shaped spring are respectively welded on the vibrator and the housing, and the elastic deformation direction of the spring is the same as the vibrating direction of the vibrator. In a vibration device having such a structure, the structure of the spring is complicated and difficult to process, and the elastic deformation direction of the spring is perpendicular to the welding surface between the vibrator and the spring. Therefore, a welding area between the vibrator and the spring may not be easily shaped, which brings difficulty during assembling.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
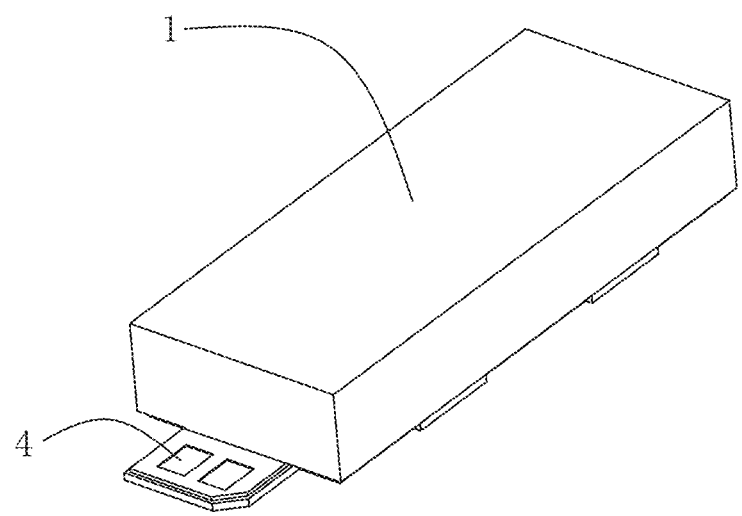
FIG. 1 is a front view of a vibration device in accordance with an exemplary embodiment of the present disclosure.

In order to make the purpose, technical solution and advantage of the present disclosure more clearly, embodiments of the present disclosure will be described in detail with reference to the accompanying drawings. However, it can be understood by those skilled in the art that, in various embodiments of the present disclosure, a plurality of technical details has been presented in order to help readers better understand the present disclosure. However, even without these technical details, or variations or modifications based on the following embodiments, the technical solutions protected by the claims of the present disclosure can still be implemented.

The present disclosure provides a vibration device 100, as shown in FIGS. 1-4, including a housing 1 having accommodating space, a vibrator 2, a stator 3, a printed circuit board (Printed Circuit Board, PCB) 4 and an elastic member 5. The elastic member 5 is configured to suspend the vibrator 2 in the accommodating space. The vibrator 2, the stator 3, the PCB 4 and the elastic member 5 are accommodated in the housing 1, and the housing 1 includes a pair of first side walls 11 symmetrically arranged along its long axis direction and a pair of second side walls 12 symmetrically arranged along a short axis direction.

The elastic member 5 is a sheet-like spring arranged in a plane perpendicular to the vibrating direction of the vibrator 2. The elastic member 5 includes a first fixing portion 51 fixedly connected with the second side wall 12, a second fixing portion 52 fixedly connected with the vibrator 2, and an S-shaped connecting portion 53 which connects the first fixing portion 51 with the second fixing portion 52 and extends along the long axis direction.

From the above contents, it is clear that, since the elastic member 5 is a sheet-like spring provided in the plane perpendicular to the vibrating direction of the vibrator 2, and the sheet-like spring has a simple structure, which is easily formed and processed by directly punching. In the assembling process, by simply fixing the second fixing portion 52 of the elastic member 5 onto the vibrator 2 by welding or other fixing manners, and then fixing the first fixing portion 51 onto the second side wall 12, the assembling process can be completed. Meanwhile, the stress of the elastic member 5 subjected by the welding surface between the vibrator 2 and the elastic member 5 is eliminated, thereby reducing the assembling difficulty. Moreover, the elastic member 5 having such a structure does not occupy vertical space in the vibrating direction of the vibrator 2, which improves space utilization and provides more space for magnetic circuit. In addition, the elastic member 5 can also be made in other manners other than punching, and an operator can select a specific processing manner according to specific processing demands, which will not be illustrated in detail herein.

Specifically, in an exemplary embodiment, the housing 1 includes a first cover plate 13 and a second cover plate 14 connected with the first cover plate 13. The first cover plate 13 further includes a bottom plate 131 and a surrounding side wall 132 extending from the bottom plate 131 in a direction to the second cover plate 14. The surrounding side wall 132 includes a pair of first side walls 11 disposed symmetrically in its long axis direction and a pair of second side walls 12 disposed symmetrically in a short axis direction. The first fixing portion 51 is welded on an end surface of the second side wall 12 facing the second cover plate 14.

In an exemplary embodiment, the vibrator is a magnetic circuit unit, however, in another exemplary embodiment, the vibrator can also be a coil.

Specifically, the vibrator 2 includes a magnetic circuit unit, the magnetic circuit unit includes a magnetic conductor 21 having accommodating space, a magnet 22 disposed in the magnetic conductor 21, and a pole plate 23 attached to the magnet 22. The magnetic conductor in the present disclosure is a yoke. The vibrator 2 is suspended in the housing 1 by the elastic member 5 and vibrates along a direction perpendicular to the bottom plate 131.

The stator 3 includes a coil 31, and a PCB 4 is provided between the coil 31 and the second cover plate 14. The coil 31 is fixed with the PCB 4, and the coil 31 is arranged by winding the magnet 22 and spaced from the magnet 22.

Obviously, the structure of the vibrator 2 will not be limited by the above-described component composition. It should be understood that, in the vibration device 100, any component moving reciprocally within the housing 1 by the electromagnetic induction force between the coil 31 and the magnet 22 can be regarded as a vibrator 2. It should be noted that, in the present embodiment, the second fixing portion 52 is welded on the magnetic conductor 21.

It should be understood that, in an exemplary embodiment, the S-shaped connecting portion 53 includes a first straight arm 531 horizontally extending from the second fixing portion 52 along the short axis direction of the housing 1, a second straight arm 532 bending from a tail end of the first straight arm 531 in an opposite direction and horizontally extending, and a third straight arm 533 bending from a tail end of the second straight arm 532 in an opposite direction and horizontally extending to the first fixing portion 51. It should be noted that, the angle formed by bending of the tail end of the first straight arm 531 and the tail end of the second straight arm 532 can be adjusted according to specific processing demands, so that the elastic member 5 can be easily processed.

Figure 2:
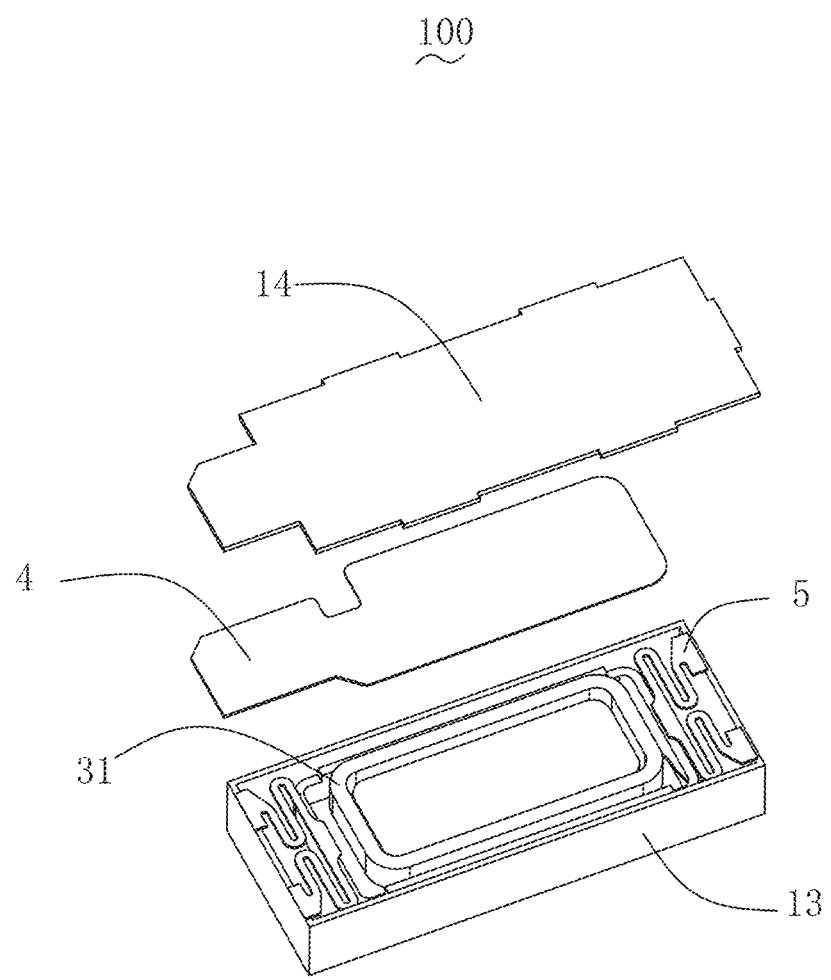
FIG. 2 is a partial exploded view of the vibration device shown in FIG. 1.
Figure 3:
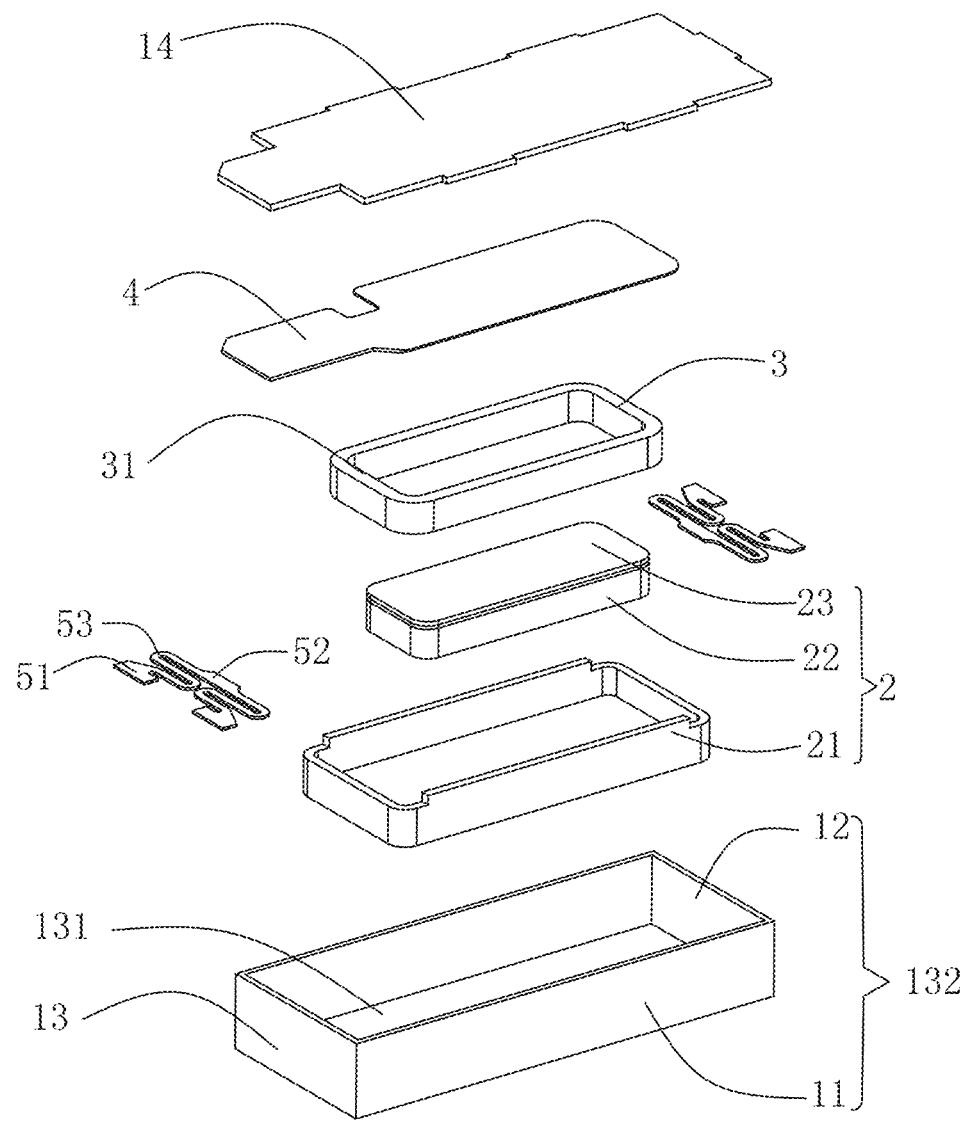
FIG. 3 is an exploded view of the vibration device shown in FIG. 1.
Figure 4:
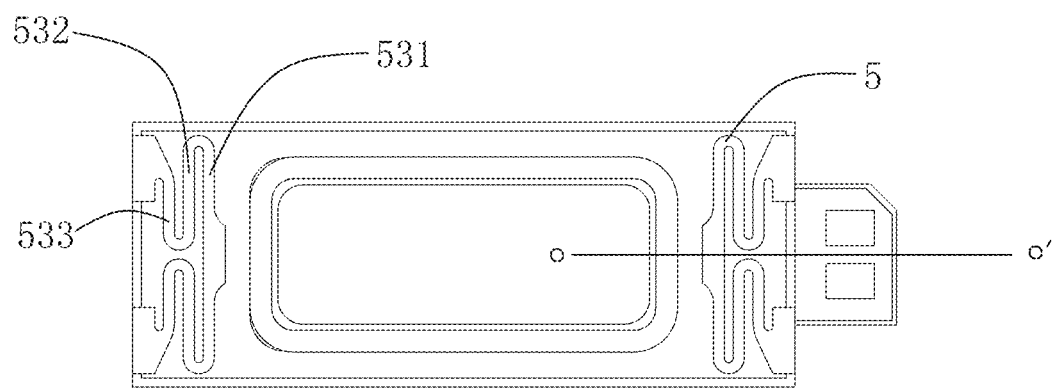
FIG. 4 is a schematic view of a combined structure of a stator, a housing and an elastic member of the vibration device in accordance with the present disclosure.

In addition, with reference to FIGS. 2-4, in an exemplary embodiment, a pair of elastic members 5 is provided, and each second side wall 12 of the housing 1 is provided with an elastic member 5. Each elastic member 5 is provided with a pair of S-shaped connecting portions 53. The second fixing portion 51 includes a central axis OO' perpendicular to the second side wall 12, and the pair of S-shaped connecting portions 53 are arranged in axial symmetry with respect to the central axis OO' of the second fixing portion 52. It should be noted that, in an exemplary embodiment, a pair of first fixing portions 51 is provided, and the two first fixing portions 51 are also arranged in axial symmetry with respect to the central axis OO'. Accordingly, the symmetrical structure of the elastic members 5 makes vibration of the vibrator 2 more stable. Obviously, in other exemplary embodiments, it is also possible to provide a pair of second fixing portions and a single first fixing portion, and to provide one or more S-shaped connecting portion to connect the first fixing portion with the second fixing portion.

In addition, in an exemplary embodiment, the magnetic conductor 21 and the housing 1 are spaced from each other to form interval space, and the S-shaped connecting portion 53 of the elastic member 5 is accommodated in the interval space, so that space utilization of the vibration device is improved, and more space is provided for the magnetic circuit.

Those skilled in the art shall understand that, the above embodiments are examples for implementing the present disclosure, in practical applications, various modifications can be made without departing from the spirit and scope of the present disclosure.

What is claimed is:

1. A vibration device, comprising:
   a housing having accommodating space,
   a vibrator accommodated in the accommodating space,
   a stator accommodated in the accommodating space, and,
   an elastic member, configured to suspend the vibrator in the accommodating space
   wherein one of the vibrator and the stator comprises a magnetic circuit unit, and the other one of the vibrator and the stator comprises a coil,
   the housing comprises a pair of first side walls symmetrically arranged in a long axis direction of the housing and a pair of second side walls symmetrically arranged in a short axis direction of the housing, the elastic member is a sheet-like spring arranged perpendicular to a vibrating direction of the vibrator, and the elastic member comprises a first fixing portion fixedly connected with the housing, a second fixing portion fixedly connected with the vibrator, and an S-shaped connecting portion which connects the first fixing portion with the second fixing portion and extends along the long axis direction;
   a pair of elastic members is provided, and each second side wall of the housing is respectively provided with one elastic member; each elastic member comprises a pair of S-shaped connecting portions arranged in axial symmetry with respect to a central axis OO' of the second fixing portion.

2. The vibration device as described in claim 1, wherein the vibrator comprises the magnetic circuit unit, and the magnetic circuit unit comprises a magnetic conductor having containing space, a magnet arranged in the magnetic conductor and a pole plate attached to the magnet, wherein the stator comprises the coil.

3. The vibration device as described in claim 2, wherein the second fixing portion is fixedly connected with the magnetic conductor.

4. The vibration device as described in claim 1, wherein a pair of first fixing portions is provided and are arranged in axial symmetry with respect to the central axis OO' of the second fixing portion.

5. The vibration device as described in claim 1, wherein each S-shaped connecting portion comprises a first straight arm horizontally extending from the second fixing portion along the short axis direction of the housing, a second straight arm bending from a tail end of the first straight arm in an opposite direction and horizontally extending, and a third straight arm bending from a tail end of the second straight arm in an opposite direction and horizontally extending to the first fixing portion.

6. The vibration device as described in claim 1, wherein the magnetic conductor and the housing are spaced from each other to form interval space, and the S-shaped connecting portion of the elastic member is accommodated in the interval space.

7. The vibration device as described in claim 1, wherein the housing comprises a first cover plate and a second cover plate connected with the first cover plate, the first cover plate comprises a bottom plate and a surrounding side wall extending from the bottom plate in a direction to the second cover plate, the first fixing portion is fixed on an end surface of the surrounding side wall directly facing the second cover plate.

8. The vibration device as described in claim 1, wherein the central axis OO' of the second fixing portion is parallel to the first side wall.

9. The vibration devices as described in claim 1, wherein the two S-shaped connecting portions of each elastic member are arranged interval.

* * * * *